(12) United States Patent
Loshe

(10) Patent No.: US 6,352,159 B1
(45) Date of Patent: Mar. 5, 2002

(54) DUAL DECK DEWATERING SCREEN

(75) Inventor: Dale Loshe, New Haven, IN (US)

(73) Assignee: Deister Machine Company, Inc., Fort Wayne, IN (US)

(*) Notice: Subject to any disclaimer, the term of this patent is extended or adjusted under 35 U.S.C. 154(b) by 0 days.

(21) Appl. No.: 09/531,242

(22) Filed: Mar. 21, 2000

Related U.S. Application Data

(62) Division of application No. 09/030,460, filed on Feb. 25, 1998.

(51) Int. Cl.[7] .................................................. B07B 1/28
(52) U.S. Cl. ....................... 209/268; 209/269; 209/281; 210/785
(58) Field of Search ................................. 209/268, 269, 209/281; 210/388, 785

(56) References Cited

U.S. PATENT DOCUMENTS

| | | | |
|---|---|---|---|
| 65,664 A | 6/1867 | Gilbert | |
| 479,774 A | 7/1892 | Jewell | |
| 2,298,182 A | 10/1942 | Strube | |
| 2,329,333 A | * 9/1943 | Carter | |
| 4,306,974 A | * 12/1981 | Harry | ......................... 210/388 |
| 4,495,065 A | 1/1985 | DeReamer et al. | |
| 4,956,078 A | 9/1990 | Magerowski et al. | |
| 5,614,094 A | 3/1997 | Deister et al. | |

* cited by examiner

*Primary Examiner*—Donald P. Walsh
*Assistant Examiner*—Jonathan R. Miller
(74) *Attorney, Agent, or Firm*—Barnes & Thornburg

(57) ABSTRACT

A vibrating dual deck dewatering unit which includes a lower screen deck and an upper screen deck. Material being processed by the unit is discharged from the upper screen deck onto the lower screen deck in such a manner that excess water is allowed to backflow beneath the upper screen deck, while solids are directed in an opposite direction. The upper screen deck is provided with a jagged discharge lip which creates interruptions or gaps in the flow of discharged solids. The excess water which is discharged from the upper screen deck is allowed to backflow through the interruptions or gaps in the discharged solids that are created by the jagged discharge lip of the upper screen deck.

5 Claims, 6 Drawing Sheets

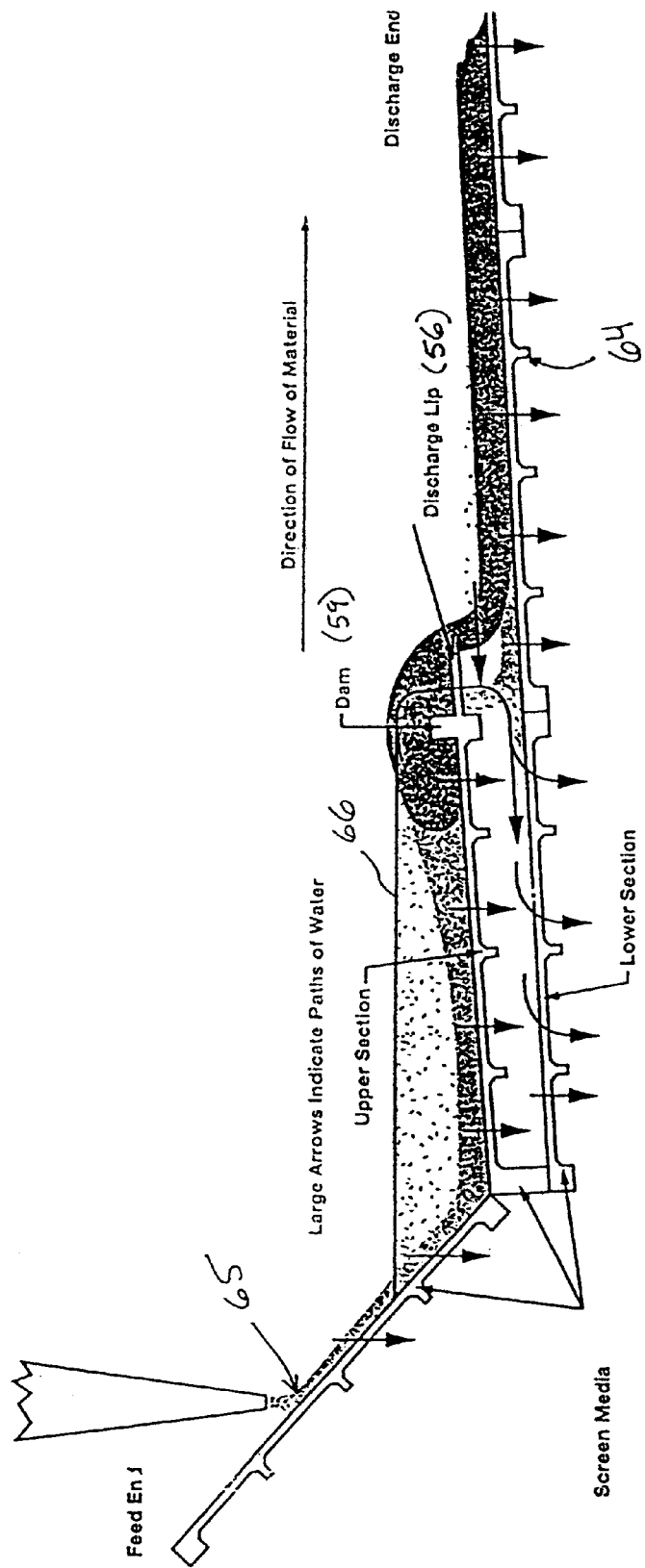

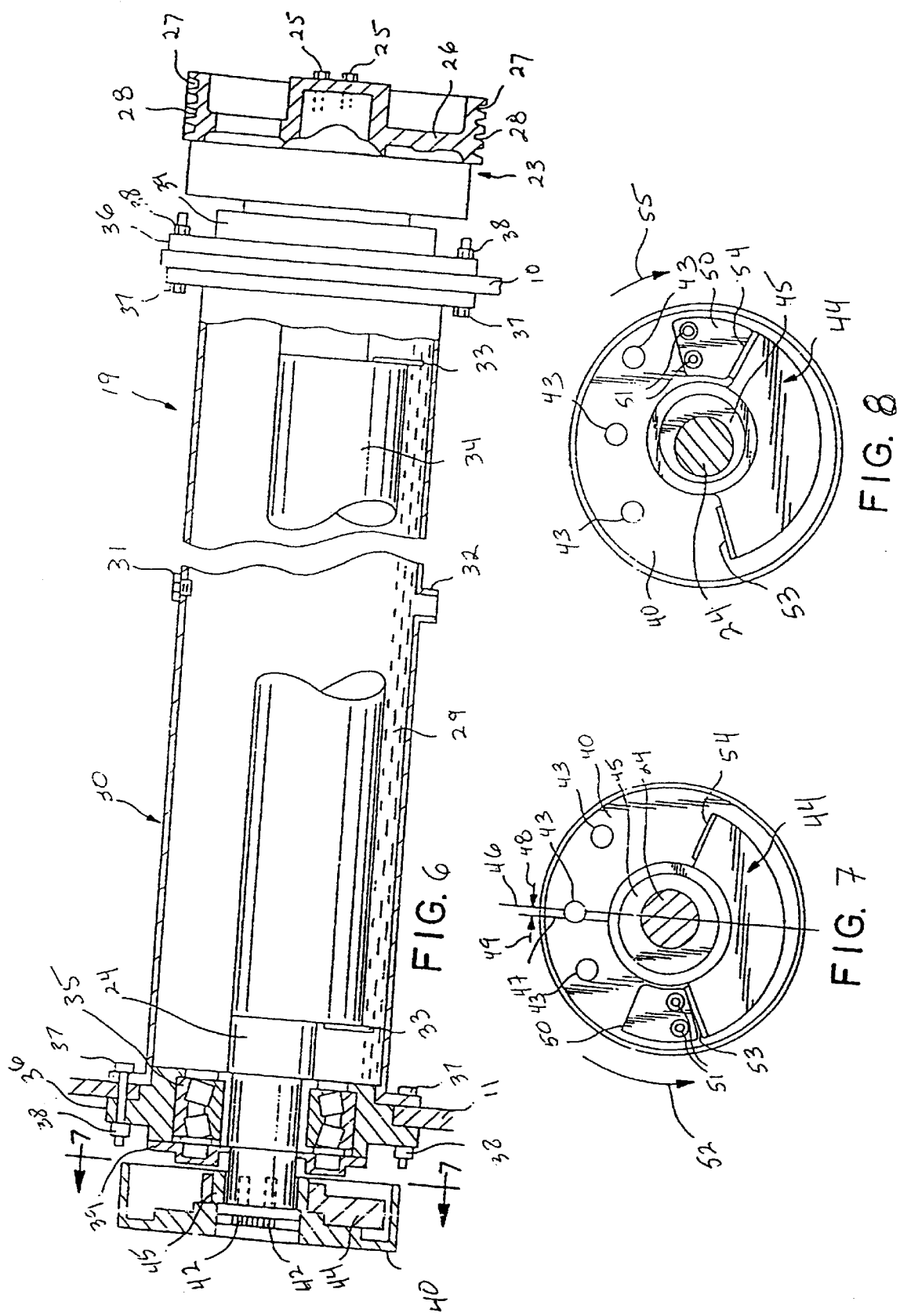

DUAL DECK DEWATERING SCREEN

This is a continuation, of Application Ser. No. 09/030,460, filed Feb. 25, 1998.

TECHNICAL FIELD

The present invention relates to a unit for dewatering dredged or slurried material. More particularly, the present invention relates to a vibrating screen unit for dewatering dredged or slurried material which incorporates a dual deck screen system.

BACKGROUND ART

Dredges dig and remove material, such as sand and gravel, from the bottom of bodies of water, such as lakes and rivers. The primary means for dewatering dredged or slurried material is typically a vibrating screen unit having a deck surface covered by a screen mesh media which has a matrix of openings of a predetermined size and arrangement. Unlike conventional vibrating screen applications where material separation is achieved by having as much material as possible of a size less than that of the openings in the screen media fall through the screen deck surface, dewatering of material is achieved by retaining as much of the material less than the size of the openings as possible on the screen deck surface while passing the water through the openings. During dewatering, a small amount of fine grit passes through the openings in the screen mesh media while the dewatered material is discharged onto a conveyor belt for processing at a discharge end of the unit.

In general, for a particular feed material, the dewatering efficiency of vibrating screen units is dependent on the size or surface area of the screen deck. Capacity can be increased by enlarging the screen deck of vibrating screen units and increasing the feed rate of slurry. However, the economics of sizing up vibrating screen units to increase capacity can be significant and even cost prohibitive.

The present invention provides vibrating screen units which have increased dewatering efficiencies for given overall sizes.

SUMMARY OF THE INVENTION

The present invention provides a vibrating screen unit for dewatering material which unit has a greater dewatering capacity than similar sized units.

The vibrating screen unit of the present invention includes upper and lower screen decks and is designed to allow excess water discharged from the upper screen deck to enter between the upper and lower screen decks.

The vibrating screen unit of the present invention includes a discharge lip on the upper screen unit which creates interruptions or gaps in the material that is discharged from the upper screen deck onto the lower screen deck. These interruptions or gaps provide passageways for excess water to flow backwards onto the lower screen deck and beneath the upper screen deck.

The present invention provides a vibrating screen unit for dewatering material which includes:

a frame;

a lower screen deck coupled to the frame;

an upper screen deck coupled to the frame; and a jagged discharge lip provided at a downstream end of the upper screen deck which jagged discharge lip interrupts the flow of solids which is discharged from the upper screen deck onto the lower screen deck.

The present invention further provides a vibrating screen unit for dewatering material which includes:

a frame;

a lower screen deck coupled to the frame having a feed end and a discharge end;

an upper screen deck coupled to the frame and having a feed end and a discharge end; and means to incline each of the upper and lower screen decks so that their respective discharge ends are elevated above their respective feed ends.

The present invention also provides a method of dewatering material which involves:

providing a vibrating dewatering unit having a lower screen deck and an upper screen deck which is positioned above a portion of the lower screen deck;

feeding a material to be dewatered onto the upper screen deck;

discharging the material from the upper screen deck onto the lower screen deck so that solids therein are directed toward a discharge end of the lower screen deck and a liquid therein is directed in an opposite direction beneath the upper screen deck.

BRIEF DESCRIPTION OF DRAWINGS

The present invention will be described hereafter with reference to the attached drawings which are given as non-limiting examples only, in which:

FIG. 5 is a side view illustrating the material flow paths in a vibrating screen dewatering unit according to the present invention during normal operation.

FIG. 6 is an elevational view with portions broken away of a shaft assembly and reversible counterweight of the present invention.

FIG. 7 is a sectional view taken along line 7—7 of FIG. 6 showing the reversible counterweight of the present invention coupled to a shaft of the unit via an eccentric bearing hub both of which are rotating in a first direction.

FIG. 8 shows the reversible counterweight and shaft of FIG. 7 being rotated in a second direction generally opposite the direction of rotation shown in FIG. 7.

BEST MODE FOR CARRYING OUT THE INVENTION

The present invention is directed to vibrating screen dewatering apparatus which include a dual screen deck design. The dewatering apparatus of the present invention have increased dewatering efficiencies which are comparable to units having much larger overall sizes. Accordingly, the dewatering apparatus of the present invention are less expensive and have a smaller footprint than known units having comparable dewatering efficiencies. The dewatering apparatus of the present invention are less sensitive to variations in hydro-cyclone efficiency so that cyclones can be set to allow more water in the underflow, and thereby lose fewer solids out the overflow. In most applications, the unders from the dewatering screen can be closed-looped back to the hydro-cyclones.

Increased dewatering efficiency is accomplished by effectively removing or reducing the depth of bed of material traveling over a portion of the openings in the screen beds and increasing the available percent of open area. The dual deck units of the present invention include an upper screen deck section that is located near the feed end of the units and which function in a conventional manner. Water and extreme fines that pass through the upper screen deck fall onto the lower screen deck. Since there is little or no bed depth of material, the water and extreme fines pass though the lower screen to the undersize hopper very quickly.

The upper screen deck includes a jagged discharge lip which creates openings or gaps in the partially dewatered material which is discharged therefrom. These openings or gaps allow excess water and a portion of fines entrained therein to flow backward beneath the upper screen deck. As the excess water discharged from the upper screen deck flows downward along the underlying lower screen deck, the fines entrained therein settle down on the screen deck surface and are conveyed toward the discharge end of the unit.

Figure 1:
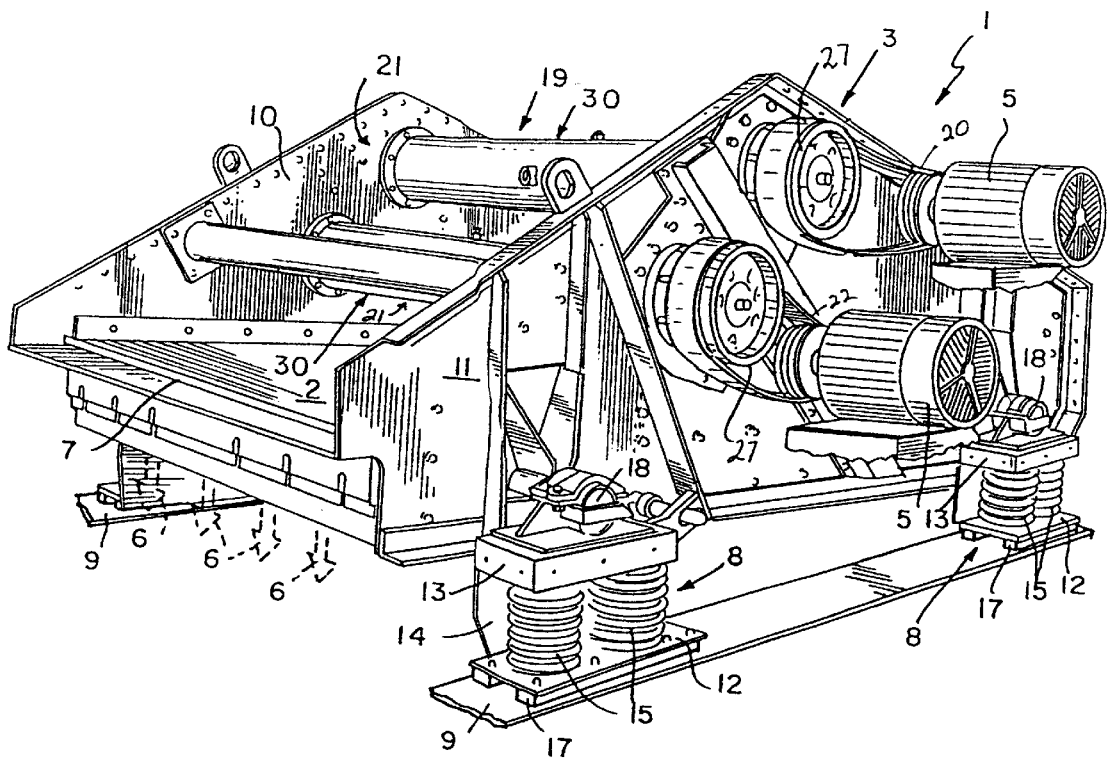
FIG. 1 is a perspective view of a vibrating screen dewatering unit according to one embodiment of the present invention.
Figure 2:
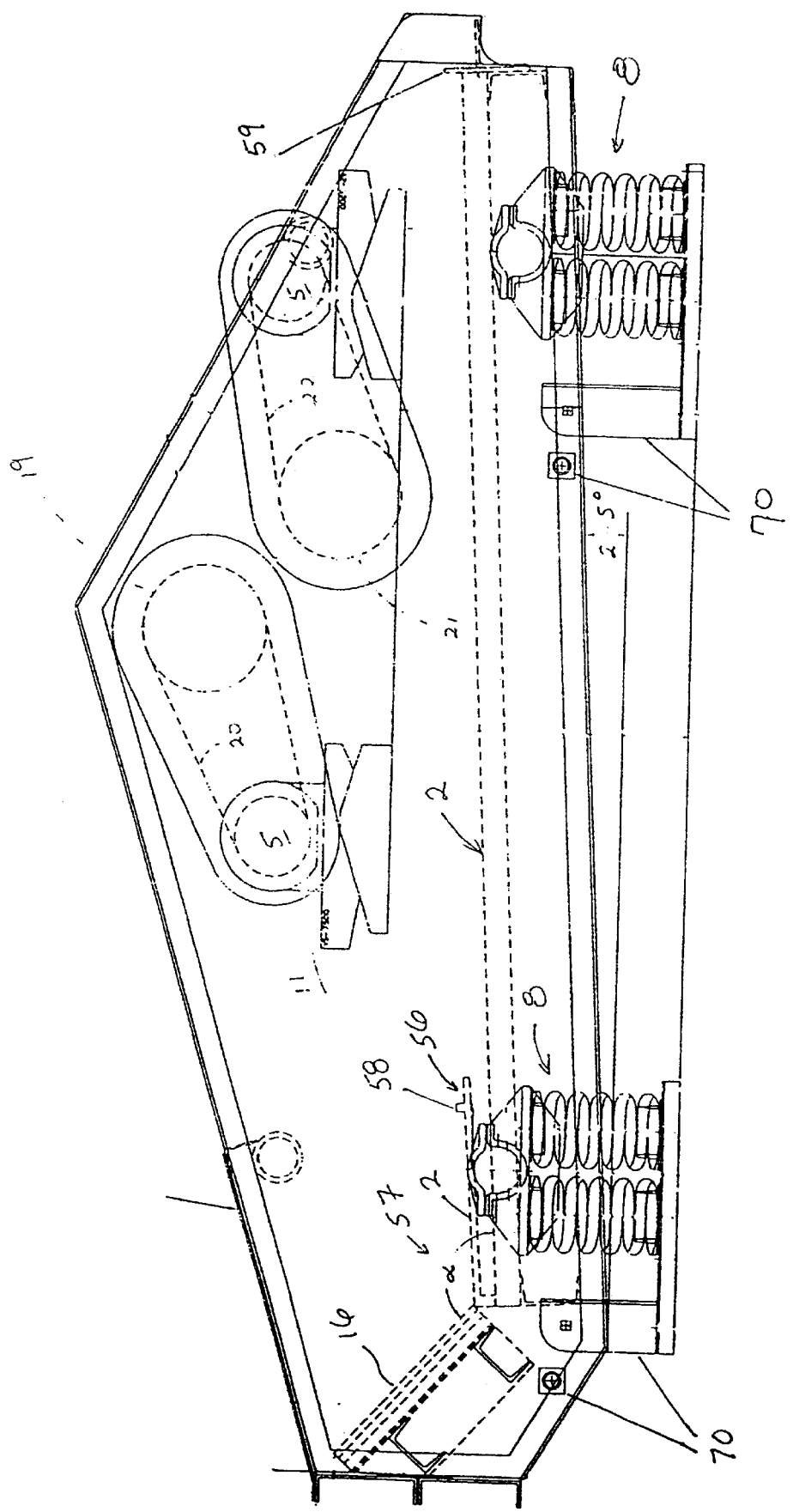
FIG. 2 is a schematic side elevational view of the vibrating screen dewatering unit of FIG. 1.

FIG. 1 is a perspective view of a vibrating screen dewatering unit according to one embodiment of the present invention. The vibrating screen dewatering unit of the present invention is identified generally by reference numeral 1 in FIG. 1. Unit 1 includes a lower screen deck 2 which is coupled to a frame 3 of the unit. Unit 1 also includes an upper screen deck 4 (FIG. 2) which is coupled to frame 3 and positioned to lie above a portion of lower screen deck 2 at the feed end. A pair of motors 5 (one shown in FIG. 1) vibrate screen decks 2 and 4 so that water, generally indicated by dashed arrows 6 in FIG. 1, can be separated from desired material, such as sand and gravel, so that the desired material exits unit 1 at discharge end 7 in a substantially clean and dewatered condition. It is noted that although FIGS. 2 and 5 depict the upstream end of the lower screen deck 2 as being aligned with the upstream end of the upper screen deck 4, it has been determined that the position of the lower screen deck 2 could be shifted so that its upstream end is located at a point midway along the length of the upper screen deck 4.

Unit 1 includes a plurality of stabilizing spring mount assemblies 8 coupled between base 9 and first and second sides 10 and 11 as shown in FIG. 1. Each spring mount assembly 8 includes a horizontal plate 12, a support plate 13 positioned above and substantially coplaner with horizontal plate 12, and an elastomeric curtain 14 coupled to support plate 13. A plurality of heavy coil springs 15 are coupled between horizontal plate 12 and support plate 13. Spring mount assemblies 8 help isolate the movement of unit 1 during vibration. Elastomeric curtains 14 can extend around all sides of plates 12 and 13 so that springs 15 are obscured from view. Curtains 14 thus enclose springs 15 to protect them from dredged or slurried material and water. As can be seen from the combination of FIGS. 2 and 3, the preferred embodiment of unit 1 includes four spring mount assemblies 8, two generally below feed panel 16 and two adjacent discharge end 7 of lower screen deck 2, so that assemblies 8 are adjacent four different corners of base 9.

The angle of vibrating screen unit 1 can be changed via the use of inclined adjustment pads 17. These pads are placed under two or four of the spring mount assemblies 8 and used to adjust the incline of the unit. Adjusting the incline of unit 1 changes the rate of travel of dredged or slurried material across respective lower and upper screen decks 2 and 4. For example, increasing the number of incline adjustment pads 17 under assemblies 8 generally below feed panel 16, without adding additional pads 17 under assemblies 8 adjacent discharge end 7, speeds up the rate of travel of dredged or slurried material across respective lower and upper screen decks 2 and 4.

Pivot trunnion assemblies 18 are located between spring mount assemblies 8 and first and second sides 10 and 11. Each pivot trunnion assembly 18 is coupled to a support plate 13 and one of either first or second sides 10 and 11 of frame 3. Pivot trunnion assemblies 18 allow the spring mount assemblies 8 to pivot when the incline of unit 1 is changed so that these assemblies remain substantially perpendicular with base 9.

In preferred embodiments, both the lower and upper screen decks 2 and 4 are pivotally adjustable up or down by approximately three degrees with respect to the base 9. Pivoting the lower and upper screen decks 2 and 4 allows the travel rate of dredged or slurried material in this section to be changed for more efficient dewatering depending upon existing feed material conditions. Although FIG. 2 depicts the upper and lower screen decks as being parallel, it is also within the scope of the present invention to provide for independent pivoting or tilting of the feed panel 16, and each of the upper and lower screen decks.

Motors 5 provide power to vibrate screen unit 1. As can be seen in FIG. 2, one motor 5 is coupled to shaft assembly 19 by drive belt 20 and the other motor 5 is coupled to shaft assembly 21 by another drive belt 22.

FIG. 2 is a schematic side elevational view of the vibrating screen dewatering unit of FIG. 1. Lower and upper screen decks 2 and 4 are visible in this view as are motors 5, first side 10 of frame 3, which lies generally opposite second side 11 (FIG. 1), and discharge end 7 of the lower screen deck 2 and discharge lip 56 of the upper screen deck 4.

FIG. 2 further shows a feed panel 16 of unit 1 into which dredged or slurried material is introduced for processing. The contents of dredged or slurried material generally includes material of a first size such as sand and material of a second size smaller than the first size such as fines, and water. Dredged or slurried feed material introduced into unit 1 via feed panel 16 first contacts feed end 57 of upper screen deck 4. Upper screen deck 4 retains material of the first size, e.g. sand and allows material of the smaller, second size, e.g. fines and water to pass therethrough and onto the lower screen deck 2. The material remaining on the upper screen deck 4, moves along upper screen deck 4 toward discharge lip 56. The discharge lip 56 has a jagged, e.g. square tooth shape which prevents a continuous curtain or sheet of retained material from cascading from the upper screen deck 4 onto the lower screen deck 2. The interruptions or gaps which are formed in the material cascading from the upper screen deck 4 by the jagged structure of the discharge lip 56 provide openings or passageways through which water discharged from upper screen deck 4 can flow backward beneath the upper screen deck 4 as discussed below.

An optional dam 58, which may have an adjustable height, can be included at the discharge lip 56 of the upper screen deck 4 as shown. As discussed below, dam 58 functions to hold back fines and water from flowing onto lower screen deck 2 until the fines and water form a deeper pool and overflows dam 58. This action increases the pressure or "head" of the water at the screen media surface of the upper screen deck 4, thereby forcing more water through the openings thereof.

The angle ∀ at which the feed panel 16 intersects upper and lower screen decks 4 and 2 can be adjusted to control the rate at which feed materials travel down the feed panel 16. Angles of 125° to 145° are generally suitable for most feed material conditions.

The lower screen deck 2 extends from the feed panel 16 to discharge end 7 as depicted. A dam 59, preferably having an adjustable height, is provided at the discharge end 7 of the lower screen deck 2 as shown. Both Dam 58 and 59 can have an adjustable height which is affected by providing a movable portion of the dams or by merely replacing the dams with dams having different heights. The upper screen deck 4 and lower screen deck 2 each include a plurality of openings which are sized to allow a particular size of material to pass therethrough during a dewatering process. The openings can be arranged in a predetermined pattern as desired. Such parameters, i.e. the size of the openings and arrangement thereof can be easily determined by those skilled in the art.

FIG. 2 shows the positioning of spring mount assemblies 8 along side 11 of the unit, and snubbers.

Dredged or slurried material introduced into unit 1 at feed panel 16 moves through unit 1 and is discharged from upper screen deck 4 at discharge lip 56 and from lower screen deck 2 at discharge end 7 by vibrating unit 1 via motors 5 as more fully discussed below. The upper screen deck 4 can be parallel to the lower screen deck 2 as depicted or angled with respect to the lower screen deck 2.

Figure 3:
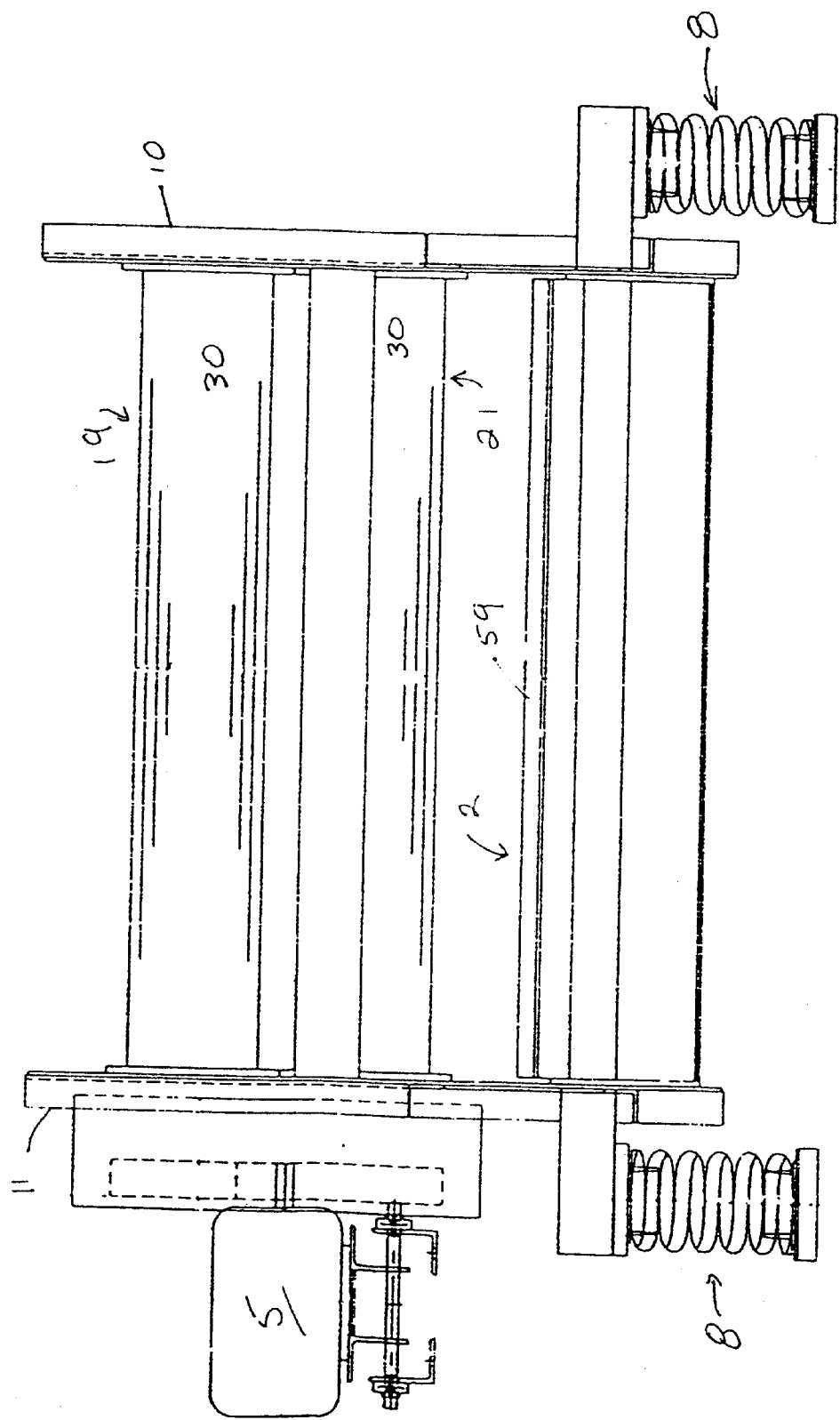
FIG. 3 is a schematic end elevational view of the vibrating screen dewatering unit of FIG. 1.

FIG. 3 is a schematic end elevational view of the vibrating screen dewatering unit of FIG. 1. Because the feed end 57 of the upper and lower screen decks are below the height of the discharge end 7 of the lower screen deck 2 as depicted in FIG. 2, the end view of FIG. 3 only shows the discharge end 7 of the lower screen deck 2 and the dam 59 which preferably has an adjustable height. FIG. 3 also depicts how the spring mount assemblies 8 are arranged on sides 10 and 11 of unit 1.

Figure 4:
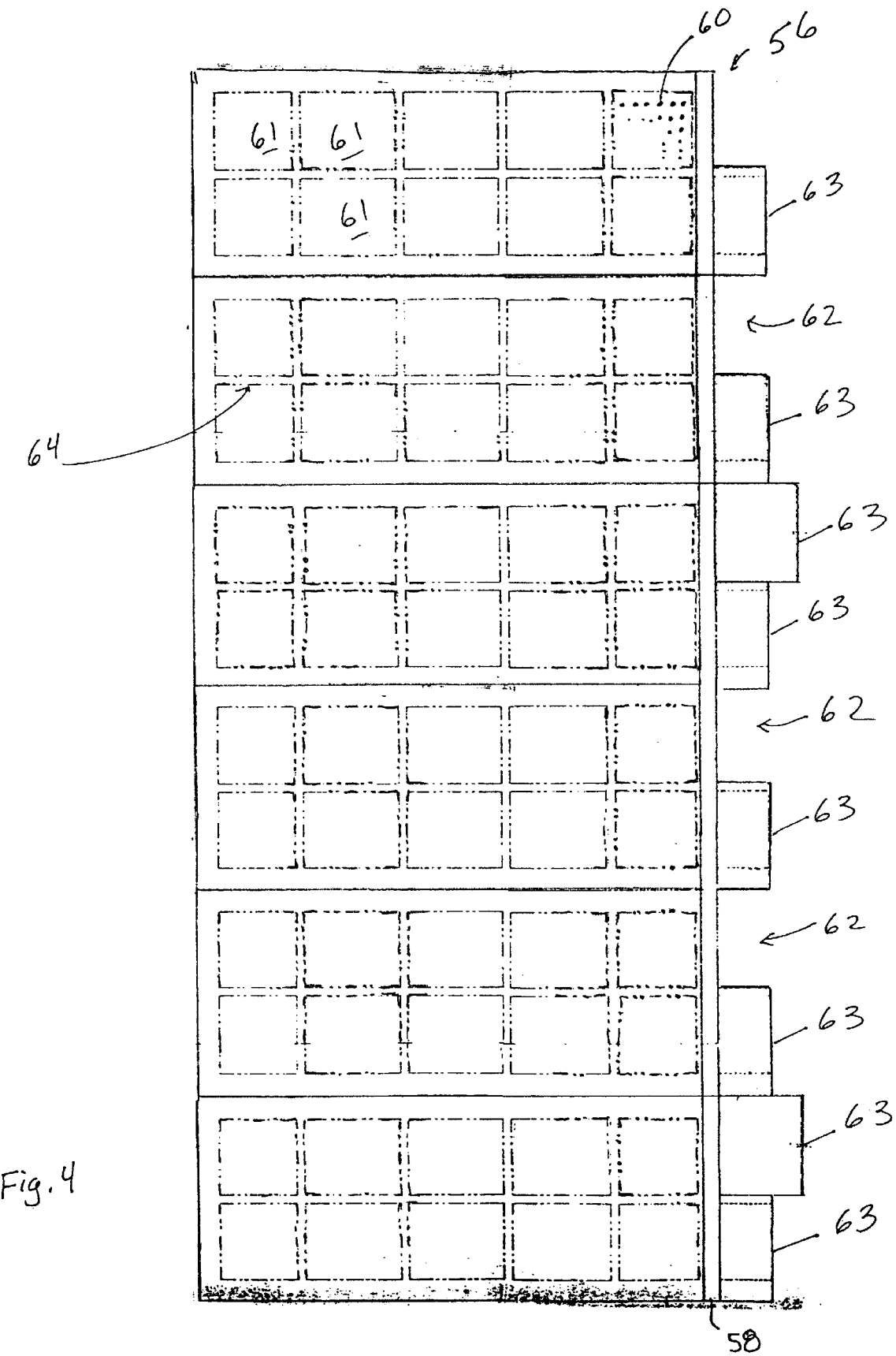
FIG. 4 is a schematic top view of an upper deck of a vibrating screen dewatering unit according to one embodiment of the present invention.

FIG. 4 is a schematic top view of an upper deck of a vibrating screen dewatering unit according to one embodiment of the present invention. Upper screen deck 4 is formed to include a plurality of openings 60 (limited number shown) of a predetermined size and arranged in a predetermined pattern to separate dredged or slurried material and prevent material larger than the size of openings 60 from passing through upper screen deck 4. Openings in the form of 0.5 mm by 10 mm slots have been found to be generally suitable for dewatering purposes. In the preferred embodiment, upper screen deck 4 is formed from a plurality of rectangular panels 61 which are positioned adjacent one another.

The jagged discharge lip 56 of the upper screen deck 4 is depicted as having a square toothed shape. Openings 62 between the teeth 63 allow portions of partially dewatered material to fall therethrough together with excess water. The remaining portion of the partially dewatered material is discharged from the ends of teeth 63. Dam 58 is depicted as being aligned with the edges of openings 62.

Although FIG. 4 depicts an embodiment of the upper screen deck 4 which has square teeth, it is possible to provide the discharge lip 56 with other jagged shapes. For example, the teeth 63 depicted in FIG. 4 could have a trapezoid shape or other shape which provides a linear discharge end. It is also possible to provide the discharge lip 56 with a "jagged" shape which is defined by a continuous linear discharge leading end and an array of openings in the discharge lip which are spaced apart from the continuous linear discharge leading end thereof. Such openings could be square, trapezoidal, triangular, or have any other shape which effects allowing excess water to back flow behind the discharged partially dewatered material.

FIG. 4 (and FIG. 5) depict the support members 64 which form a grid work that supports the screening media panels 61. The screening media can comprise a plurality of rectangular panels having openings therein. These panels can be made from a suitable durable material which is wear resistant such as urethane.

FIG. 5 is a side view illustrating the material flow paths in a vibrating screen dewatering unit according to the present invention during normal operation. A material 65 to be dewatered is fed onto feed panel 16 and transported by gravity onto the upstream end of the upper screen deck 4. Water and extreme fines pass through the openings in the upper screen deck 4 as indicated by the arrows in FIG. 5 and fall onto the lower screen deck 2. Since there is little or no bed depth of material on the portion of the lower screen deck 2 which is beneath the upper screen deck 4, the water and extreme fines pass through the lower screen deck to the undersize hopper very quickly.

The additional dewatering capacity of the unit is realized from the ability of excess water to enter between the upper and lower screen decks. This excess water overflows from the discharge lip 56 of the upper screen deck 4. As discussed above, the jagged structure of the upper screen deck discharge lip 56 creates openings or passageways through which excess water discharged from the upper screen deck 4 can flow backward through the otherwise continuous sheet or curtain of material falling from the discharge end of the upper screen deck 4. Moreover, these openings or passageways reduce the amount of fines which might otherwise be carried under the upper screen deck 4 by the excess water.

The dam 58 which can be provided at the discharge lip 56 of the upper screen deck 4 functions to hold back fines and water from flowing onto lower screen deck 2 until the fines and water form a deeper pool and overflows dam 58. This action increases the pressure or "head" of the water at the screen media surface, thereby forcing more water through the openings in the upper screen deck 4. The height of water created by dam 58 which provides the pressure or "head" is depicted in FIG. 5.

The tendency for solid particles to settle before they flow to the lowest area (near the feed end of unit 1) of the lower screen deck 2 allows for the inclusion of slightly larger openings that have a larger percent of open area. Such measures further increase the dewatering capacity of the unit.

FIG. 5 depicts the water level 66 that is maintained above the upper screen deck 4 by dam 58. This water level 66 can be varied by the varying height of dam 58 and the angle at which the upper screen deck 4 is tilted with respect to the base of the unit. Also, as depicted, the level 66 of the water is affected by the amount of partially dewatered material which is contained by and passes over dam 58. It is understood that excess water can be added as desired to the feed panel 13 or upper screen deck 4 (or lower screen deck 2) by conventional means such as spray units, or the like.

FIG. 6 is an elevational view of shaft assembly 19 shown in FIGS. 1 and 2 with selected portions broken away. Although not shown in FIG. 6, it is to be understood that shaft assembly 21 has the same components as shaft assembly 19, unless otherwise noted. Shaft assembly 19 includes a drive portion 23 that is coupled to shaft 24 via fasteners 25. Drive portion 23 includes a drive wheel 26 and a rim 27 which is formed to include a plurality of channels 28 into which portions of drive belt 20 are positioned to lie to secure drive belt 20 to rim 27 of drive wheel 26. Oil 29 is placed within shaft housing 30 via an opening that is closed via plug 31. Shaft housing 30 is also formed to include a drain plug 32, shown in FIG. 6 as being open, through which oil 29 can be removed. During operation of unit 1, drain plug 32 is closed. Oil flingers 33 are coupled to shaft counterweight 34 and throw oil 29 onto spherical roller bearings 35 when shaft 19 and shaft counterweight 34 are rotated by drive belt 20 and motor 5. Spherical roller bearings 35 must be kept oiled when unit 1 is in operation to reduce friction and heat build-up. Spherical bearings 35 are located at both ends of shaft 19 in bearing housings 36 which are mounted to shaft housing 30 and first and second sides 10 and 11 of frame 3 by fasteners 37 and lock nuts 38 as shown. Access to spherical roller bearings 35 is via covers 39.

External counterweights 40 and 41, shown in FIG. 1, are coupled to shaft 24 via fasteners, such as fasteners 42 shown in FIG. 6 for external counterweight 40. External counterweights 40 and 41 provide a means for adjusting the amplitude of vibration of unit 1 without having to disassemble a shaft assembly 19 to gain access to shaft counterweights 34. As can be seen in FIG. 1, a plurality of apertures 43 are formed in both external counterweights 40 and 41. Apertures 43 reduce the mass of external counterweights 40 and 41 to provide an additional means of adjusting the amplitude of vibration of unit 1. The number and positioning of apertures 43 can be varied according to the needed amplitude.

In order to change the amplitude of vibration of unit 1, either one or both of external counterweights 40 and 41 must be removed and modified or one or both of shaft counterweights 34 removed and replaced or modified. Such procedures are time consuming. This is particularly problematic for vibrating screen units that encounter different feed material conditions.

Reversible counterweight 44 coupled to shaft 24 via eccentric bearing hub 45 addresses this problem by producing, in combination with eccentric counterweight 40 and shaft counterweight 34, two different vibratory amplitudes for unit 1 depending upon the direction of rotation of reversible counterweight 44. Although not shown, a similar reversible counterweight 44 is also coupled to eccentric counterweight 41.

As can be seen in the sectional view of FIG. 7, reversible counterweight 44 is eccentrically mounted to shaft 24 via eccentric bearing hub 45. This eccentric mounting is generally indicated by line 46 which generally passes through the center of shaft 24, line 47 which generally passes through the center of eccentric bearing hub 45 and arrows 48 and 49 which indicate the amount of offset between these centers. A stop block 50 is coupled to external counterweight 40 via fasteners 51. When shaft 24 is rotated in a counterclockwise direction generally indicated by arrow 52, stop block 50 strikes first impact end 53 of reversible counterweight 44 to rotate reversible counterweight 44 in the counterclockwise direction. Although not shown, when shaft 24 is rotated in the counterclockwise direction generally indicated by arrow 52, both reversible counterweight 44 and shaft counterweight 34 are on the same side of shaft 24. Because reversible counterweight 44 and shaft counterweight 34 are on the same side of shaft 24, their masses combine to produce a larger centrifugal force and vibratory amplitude than otherwise normally occurs with only shaft counterweight 34 and external counterweight 40. This larger amplitude is used to increase stratification of material on upper and lower screen decks 4 and 2 so that a greater quantity of material below the opening sizes of each of these decks goes to the bottom of the bed of material on each of the screen decks where it is more likely to pass through the openings in these decks. This larger amplitude is particularly useful as the depth of the material bed on the screen decks increases.

Reversible counterweight 44 also includes a second impact end 54 which stop block 50 strikes when the direction of shaft 24 is reversed to the clockwise direction generally indicated by arrow 55 in FIG. 8. Upon impact between stop block 50 and second impact end 54, reversible counterweight 44 begins to also rotate in the clockwise direction. Although not shown, when shaft 24 is rotated in the clockwise direction, shaft counterweight 34 and reversible counterweight 44 lie on opposite sides of shaft 24. When reversible counterweight 44 and shaft counterweight 34 lie on opposite sides of shaft 24, their masses oppose one another to produce a smaller centrifugal force and vibratory amplitude for screen unit 1. This smaller amplitude is used during clean material conditions.

The frequency of vibration of screen unit 1 can be also adjusted in addition to the above-described adjustment of the vibratory amplitude of unit 1. Adjusting the frequency of vibration of screen unit 1 affects the dewatering efficiency in such a way that the slower the frequency of vibration the more time material has to be conveyed across respective upper and lower screen decks 4 and 2. An adjustable frequency can be achieved in any one of a number of manners such as an electronic variable frequency drive. Varying the frequency of vibration in combination with varying the amplitude of vibration allows for extensive adjustment of the material flow rate across the screen decks of the unit. A particular combination of speed and amplitude can be chosen which works best with a given material condition. Any one of a number of means such as electronic variable frequency drives or hydraulic motors can be used to vibrate and adjust the vibration frequency of the unit. Adjustment of the vibratory frequency along with changes in the vibratory amplitude allow for extensive adjustment of both unit speed and stroke to optimize those quantities for given material conditions.

The present invention is described above as being directed to a vibrating screen unit which is specifically designed to include dual screen decks, i.e., the upper and lower screen decks. In addition to this embodiment, it is possible to retrofit existing vibrating dewatering units to include the dual screen deck configuration of the present invention. For example, it is possible according to the present invention to retrofit a vibrating dewatering unit which includes a single screen deck with an upper screen deck according to the present invention.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed is:

1. A method of dewatering material which comprises:
providing a vibrating dewatering unit having a lower screen deck and an upper screen deck which is positioned above a portion of the lower screen deck;

feeding a material to be dewatered onto the upper screen deck;

impeding movement of the material to disrupt concurrent flow of solids and liquids therein;

interrupting discharge of the material from the upper screen deck to the lower screen deck to vary the discharge of the material along an edge of a downstream end of the upper screen deck; and discharging the material from the upper screen deck onto the lower screen deck so that solids therein are directed toward a discharge end of the lower screen deck and a liquid therein is directed in an opposite direction beneath the upper screen deck.

2. A method of dewatering material according to claim 1, further comprising partitioning the flow of solids discharged from the upper screen deck so as to form passageways in the discharged solids through which the liquid can flow backward onto the lower screen deck beneath the upper screen deck.

3. A method of dewatering material according to claim 1, further comprising maintaining a pressure head of liquid on the upper screen deck.

4. A method of dewatering material according to claim 3, wherein the pressure head is created by means of a dam.

5. A method of dewatering material according to claim 1, further comprising inclining each of the upper and lower screen decks upwardly.

* * * * *